May 28, 1968  L. F. MILLER  3,385,347

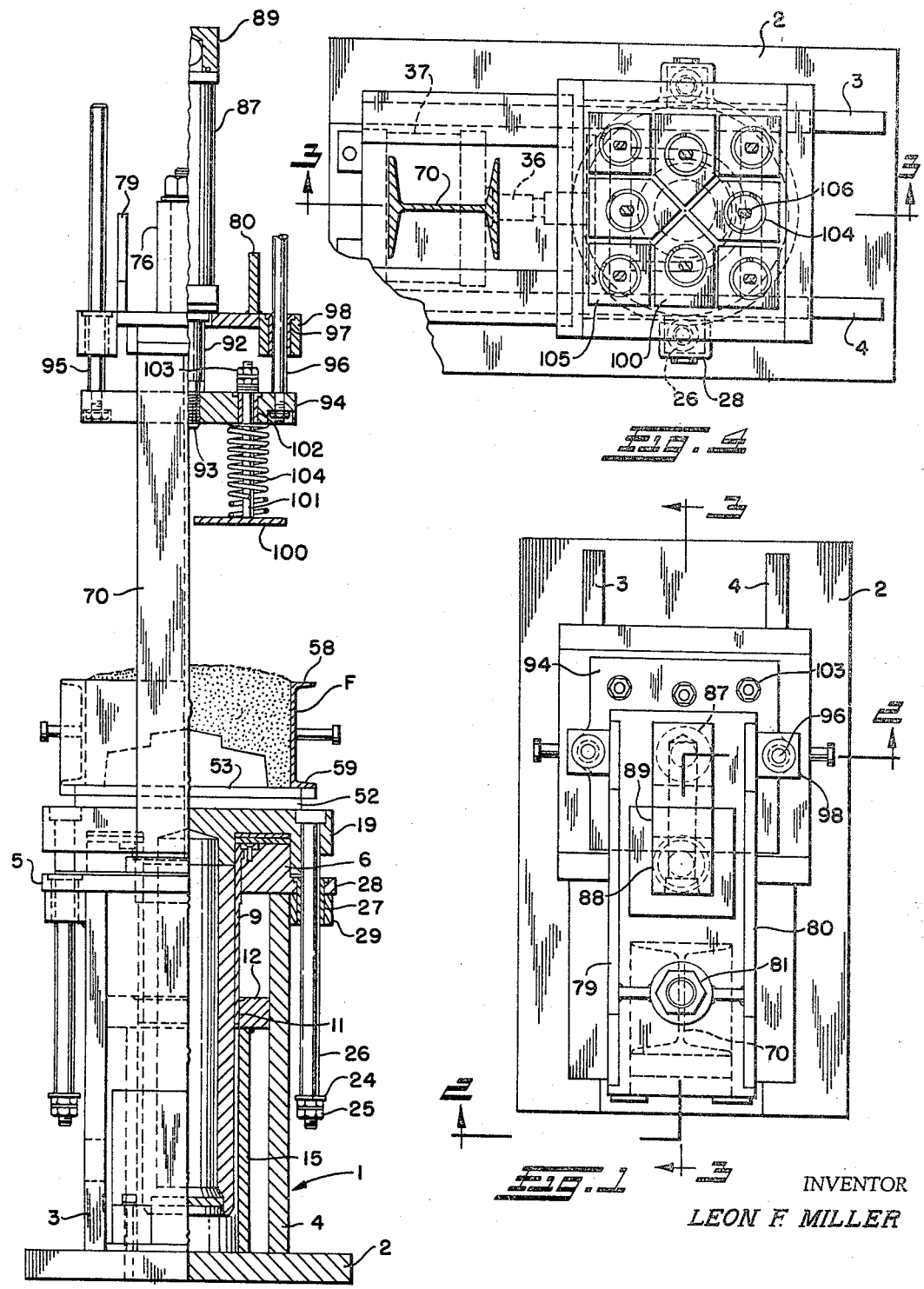

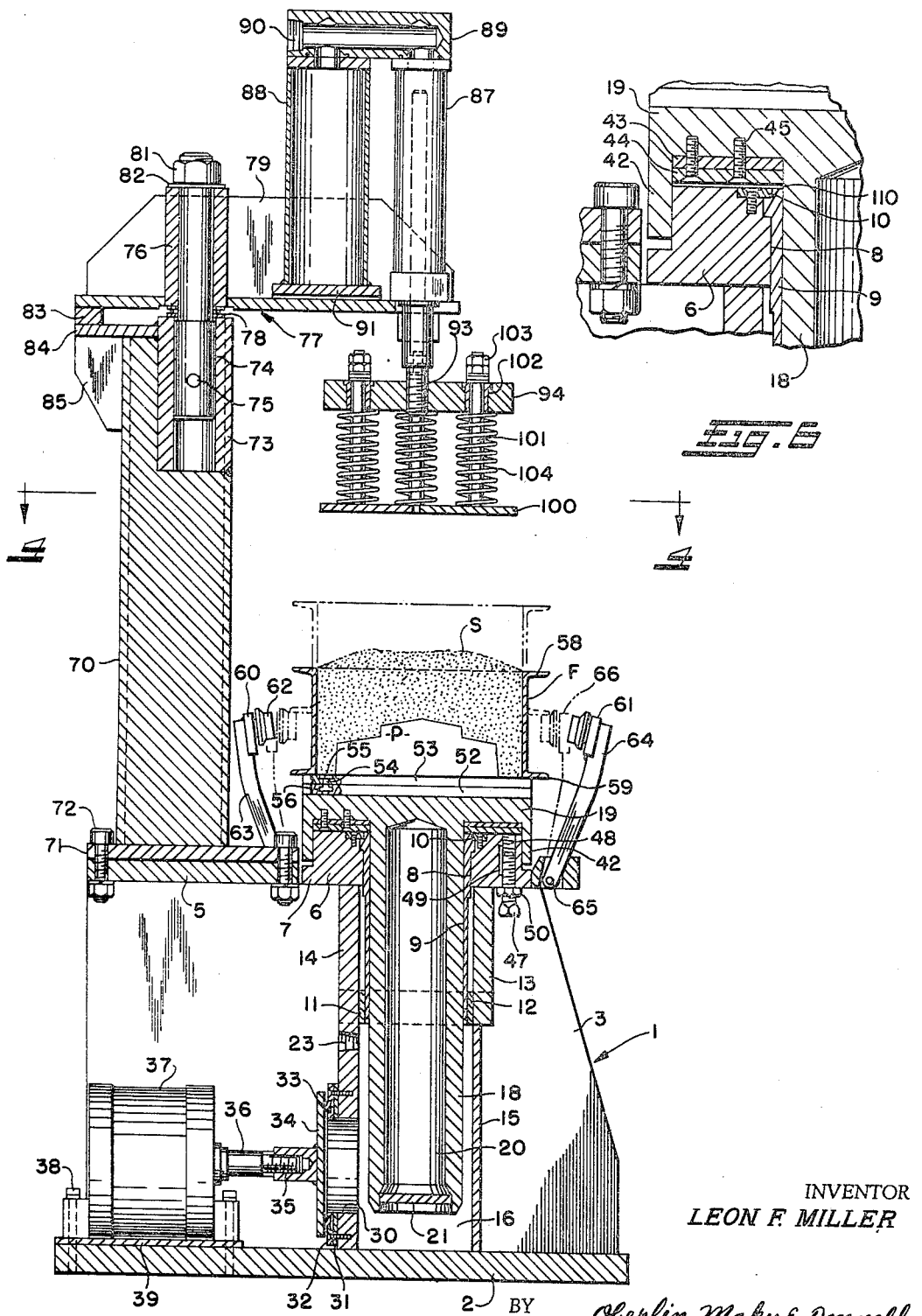

JOLT MOLDING MACHINE

Filed Jan. 24, 1966  3 Sheets-Sheet 3

INVENTOR
*LEON F. MILLER*

BY *Oberlin, Maky & Donnelly*
ATTORNEYS

United States Patent Office 3,385,347
Patented May 28, 1968

3,385,347
JOLT MOLDING MACHINE
Leon F. Miller, Rocky River, Ohio, assignor to The Osborn Manufacturing Company, Cleveland, Ohio, a corporation of Ohio
Filed Jan. 24, 1966, Ser. No. 522,643
15 Claims. (Cl. 164—206)

This invention relates generally as indicated to a foundry molding machine and more particularly to a jolt molding machine capable of ramming a foundry mold to the desired degree of hardness with but a single jolt.

Conventional jolt molding machines utilize compressed air to elevate a table supporting the pattern containing sand-filled flask and by uncovering venting ports on upward movement, then to drop such table through a relatively short stroke as, for example, about 2 inches into direct contact against a rather massive anvil. When the table drops the exhaust ports are recovered and with continual jolt air supply, the jolt process is repeated for as long as desired to ram the sand about the pattern within the flask.

Jolt molding machines have many drawbacks not the least of which is the noise and vibration imparted through the anvil to the foundation or support structure. Much of the energy generated in such jolt molding machines is lost in the transmittal of deleterious shock waves through the machine frame and needless to say these machines are quite inefficient. Additionally, the metal-to-metal contact between the table and anvil may tend to cause the sand particles within the flask to rebound and accordingly most jolt molding machines require a subsequent mechanical squeeze operation.

Attempts have been made to control or regulate the normal sharp impact resulting from jolting operations as seen for example in Miller et al., Patent 3,205,542 wherein the anvil is supported resiliently on a body of oil; however, repeated metal-to-metal jolt impacts are usually required even with a cushioned anvil to position properly the sand about the pattern for a subsequent mechanical squeeze.

It has therefore been a continuous problem in the construction and operation of foundry molding machines to obtain a jolt molding machine which will not require repeated metal-to-metal impact shocks and the subsequent mechanical squeeze to obtain a foundry mold of the desired uniform hardness.

It is accordingly a principal object of the present invention to provide a jolt molding machine which avoids metal-to-metal contact.

Another principal object is the provision of a jolt molding machine capable of ramming a foundry mold to the desired uniform hardness with but a single jolt impact.

A further principal object is the provision of a jolt molding machine wherein the characteristics of the impact may closely be controlled.

Yet another principal object is the provision of a jolt molding machine utilizing a resilient cushion between the table and anvil not subject to wear.

A further object is the provision of a jolt molding machine wherein the table supporting the pattern containing sand-filled flask is accelerated to an extremely high maximum velocity before jolt impact.

Another object is the provision of a long stroke jolt molding machine wherein the table supporting the pattern containing sand-filled flask is dropped at high velocity onto a confined air cushion avoiding metal-to-metal contact between the table and anvil.

Yet another object is the provision of a jolt molding machine incorporating a drop accelerator to obtain such high velocities prior to impact.

A still further object is the provision of such jolt molding machine utilizing such drop accelerator incorporating a weight operative to confine and further compact the sand at the moment of impact.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is a top plan view of a machine in accordance with the present invention;

FIG. 2 is a fragmentary vertical section of such machine taken substantially on the line 2—2 of FIG. 1;

FIG. 3 is a transverse section taken substantially on the line 3—3 of FIGS. 1 and 4;

FIG. 4 is a fragmentary horizontal section taken substantially on the line 4—4 of FIG. 3;

FIG. 6 is a fragmentary vertical section of the trapped air pocket at the moment of impact.

Figure 5:
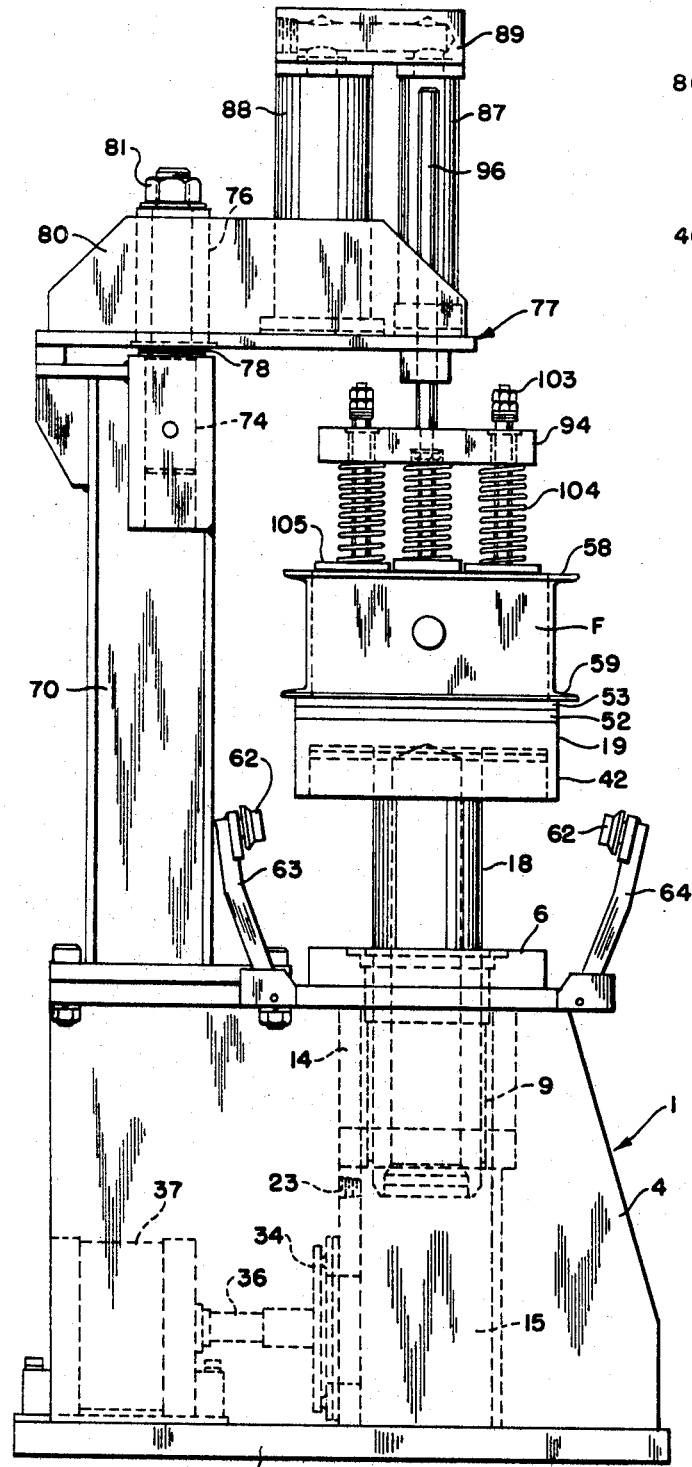
FIG. 5 is an elevation of the machine similar to the section of FIG. 3 illustrating the machine in its elevated position prior to the dropping of the pattern containing sand-filled flask.

Referring now more particularly to such annexed drawings and with particular reference to FIGS. 1, 2 and 3, it will be seen that the machine comprises a base section 1 comprising a bed plate 2 having two upstanding laterally spaced side plates 3 and 4 which are joined at the top rear of the base section by bridge plate 5 and at the front of the machine by an annular base member 6 having a bottom flange 7 which base member in conventional molding machines could be termed an anvil.

The base member 6 is provided with a central annular opening 8 in which is fitted an elongated bushing 9 secured at the top by bushing retainer ring 10. The lower end of the bushing 9 is confined within eccentric opening 11 in plate 12 pendantly supported beneath the base member 6 by front plate 13 and rear plate 14 with the latter extending completely from the bed plate 2 to the base member 6. A U-shaped enclosure 15 extends from the plate 12 to the bed plate 2 forming air chamber 16 enclosing the bottom of the elongated bushing 9.

Fitted within the bushing 9 for vertical sliding movement is elongated piston 18 formed integrally with table 19. The piston includes an elongated hollow chamber 20 which may be closed at the bottom by plate 21.

To elevate the table 19 air may be supplied through inlet port 23 and such elevation of the table will be limited by stop washers 24 secured by nuts 25 to the bottom of table guide rods 26 which rods are secured to each side of the table as seen in FIG. 2 and project downwardly through shoulder bushings 27. Such shoulder bushings are positioned in lateral projections 28 of the flange 7 of the base member 6 as well as in hubs 29 secured to the base plates 3 and 4.

To drop the table, the plate 14 is provided with a large exhaust port 30 surrounded exteriorly by spacer ring 31 and exhaust seal block 32 with the latter carrying annular frusto-conical exhaust seal 33. The exhaust port 30 is normally closed by exhaust shut-off valve member 34 threadedly secured as at 35 to rod 36 of large diameter pneumatic piston-cylinder assembly 37. For example, in the illustrated embodiment, the assembly 37 may have a 14″ bore with a 4″ stroke cushioned at both ends. The assembly is mounted by suitable fasteners 38 through mounting plate 39 to bed plate 2. By way of comparison, the diameter of the exhaust port 30 may be approximately 9″.

The table 19 is provided with a skirt 42 which fits closely over the upstanding portion of the base member 6 with a machine designed clearance which may be on the order of .008 inch with a tolerance of approximately —0, +2. As seen more clearly in FIG. 6, the interior of the table above the base member 6 and within the confines of the skirt 42 may be provided with spacer plates as shown at 43 and 44 which may be secured in place by fasteners 45. The addition of or removal of the plates 43 and 44 controls the vertical effective interior height of the skirt 42 and, of course, the volume of the chamber formed by such skirt as it telescopes downwardly over the upstanding portion of the base member 6.

Also to control the volume of such chamber and to provide controlled venting of such chamber there is provided an adjusting screw 47 seen in FIG. 3 threaded in tapped aperture 48 leading from the bottom of the base member 6 to the top thereof. The adjusting screw 47 also cooperates with a vent passage 49 and the vertical position of such screw controls the amount of air that may move through such vent passage. A jam nut 50 may be utilized to lock the screw in place once adjusted.

The table 19 supports a vent plate 52 and on top of such vent plate there is provided a pattern plate 53 supporting pattern P. Passages shown at 54 may be provided in pattern plate 53 leading from vents 55 strategically placed in both the pattern and pattern plate to exhaust openings 56 in the vent plate 52. A flask F of conventional variety provided with top and bottom peripheral flanges 58, and 59, respectively, is positioned on the pattern plate 53 surrounding the pattern P and such flask may be filled with molding sand S in conventional manner from an overhead hopper or the like, not shown.

The flask F may be positioned over the pattern plate supported on the table 19 by a roller conveyor including a section adjacent the table having rails 60 and 61 each with a plurality of inwardly directed rollers 62 thereon. Such rails are supported on arms 63 and 64, respectively, which may be pivoted as shown at 65 to swing the conveyor sections laterally clear of the flask flanges 58 and 59. In the phantom line position shown at 66, the conveyor rollers 62 may form a continuation of entry and exit conveyors for movement of empty flasks to the machine and removal of completed molds from the machine.

A post 70 in the form of an I-beam is mounted at the back of the machine and includes a base plate 71 which is secured by fasteners 72 to the bridge plate 5 straddling the upright base plates 3 and 4. The top of the post 70 is provided with a vertically extending sleeve 73 which receives vertically extending pivot pin 74 cross-pinned in such sleeve as shown at 75. The pivot pin 74 projects upwardly through sleeve 76 mounted on arm 77 with a thrust bearing 78 being provided between the sleeves 73 and 76 about the pivot pin 74. The arm 77 includes two vertically extending stiffening plates 79 and 80 of the profile configuration shown more clearly in FIG. 3, and is secured to the pivot pin 74 by a nut 81 and washer 82 on top of the pin bearing against the sleeve 76. At the rear of the arm 77 there is provided a spacer block 83 beneath the bottom of the arm which cooperates with projection 84 extending rearwardly of the post 70 which is reinforced by gusset plate 85. The spacer and projection reduce bending moments in the pivot pin 74 during operation of the machine.

At the forward end of the arm 77 there is provided a vertically extending air cylinder 87 and a vertically extending air reservoir 88 connected at the top by manifold 89 having air inlet port 90 at one end thereof. The reservoir 88 is provided with a base 91 mounted on arm 77 and the rod end of piston-cylinder assembly 87 is also mounted on such arm with the rod 92 thereof projecting through the arm and being threadedly secured at 93 to weight 94. The weight comprises simply a relatively thick plate to which are secured guide rods 95 and 96 projecting upwardly through shoulder bushings 97 in hubs 98 secured to the lateral edges of the arm 77.

Squeeze feet 100 are pendantly supported from the weight 94 on rods 101 which project through shoulder bushings 102 in the weight and are provided with nuts and lock washers as shown at 103 above the weight. Relatively large coil springs 104 surround the rods 101 and extend from the feet 100 to the weight urging the feet downwardly to the position limited by the nuts 103.

Referring now more particularly to FIG. 4 it will be seen that the feet 100 may vary in shape with the four corner feet 105 being generally square in configuration while the intermediate feet are provided with pointed interiors so that all of the feet generally cover the square or rectangular area conforming closely to the interior of the flask F such that the feet as a group will telescope within the top of the flask. It is noted that the rods 101 on which the feet are mounted may be provided with flattened sides as shown at 106 and with shoulder bushings 102 of like configuration, the feet 100 will be kept from rotating out of the position shown.

*Operation*

Referring now additionally to FIGS. 5 and 6, it will be understood that the operation of the machine may vary substantially from the cycle about to be described. In any event, with the table 19 in the lowermost position seen in FIG. 3, a flask will be shuttled to a position above such table on the conveyor rollers 62 when the arms 63 and 64 are in the phantom line position shown. With the exhaust valve member 34 closed, and the piston-cylinder assembly 87 retracted, air will be supplied under pressure through port 23 to elevate the table 19 on which is positioned the pattern and pattern plate. When the pattern plae 53 picks up the flask F to assemble the mold box, the arms 63 and 64 may be retracted and further vertical elevation of the table may be stopped.

With the head mounted on the arm 77 swung out of the way, sand S may now be deposited in the mold box from a convenient overhead hopper, not shown. It is noted that the sand may be deposited in the flask in an intermediate elevated position thereof or if desired, the table may be lowered onto the base 6 for the step of filling the flask with sand.

After the flask is filled with sand, and the head is repositioned as shown in FIG. 3 and preferably locked in such position as by a locking pin passing through the spacer 83 and projection 84, further elevation of the table and the sand-filled flask thereon is commenced. The flask and table now achieve the position shown generally in FIG. 5 with the feet 100 and 105 engaging the top surface of the sand within the flask and such feet will adjust with respect to each other depending upon the sand resistance encountered.

Air pressure is now supplied from a convenient plant source to the inlet 90 of the manifold 89 pressurizing both the reservoir 88 and the blind end of the piston-cylinder assembly 87. The rod end of such piston-cylinder assembly may now be vented. Exhaust piston-cylinder assembly 37 is now retracted removing valve member 34 from its position covering the exhaust port 30. With the exhaust port uncovered the table supporting the sand-filled flask now is accelerated downwardly rapidly toward the base 6. As the sand-filled flask starts downwardly, its speed accelerates both due to the acceleration of gravity and to the impulse obtained from the piston-cylinder assembly 87 acting as a drop accelerator. As the table supporting the sand-filled flask moves toward the base 6, it will reach its maximum velocity just prior to the telescoping of the skirt 42 over the base 6. As this telescoping occurs, the air in the chamber formed by the skirt on the outside, the piston 18 on the inside, the base 6 on the bottom, and the plate 44 on the top, will compress decelerating the table, flask and sand therein in a very short interval and such trapped or confined air is actually compressed to a point where there is a clearance of but about .015 inch as indicated at 110 in FIG. 6 between the top of the base 6 and the bottom of the plate 44.

This clearance occurs at moment of reversal and needless to say the compression of the air to such a small volume, shown exaggerated in FIG. 6, produces substantial heat which, of course, tends to expand the trapped air further contributing to the deceleration of the body of sand within the flask and the ramming of the mold at impact. Accordingly, the table supporting the sand-filled flask actually reverses its direction at impact without any direct contact between the table and base. Thus it will be seen that even though the body of sand within the flask has accelerated to a substantial speed, direct metal-to-metal contact is avoided.

After reversal, the table may actually rebound a substantial distance depending upon the volume of the chamber formed by the telescoping skirt 42 obtained by addition or removal of spacer plates 43 and 44, or the position of the adjusting screw 47 venting such chamber. After the table and sand-filled flask with the weight thereon has rebounded a substantial distance, the exhaust valve member 34 may be closed and the arms 63 and 64 replaced in the phantom line position shown in FIG. 3 to permit the table then to settle with the rollers 62 beneath the lower flange 59 of the flask and further lowering of the table by bleeding air from beneath the piston 18 will cause the pattern P to be drawn from the completed mold which is then to be shuttled from the machine. In the meantime, of course, air will be supplied to the rod end of the piston-cylinder assembly 87 to move the weight 94 back to the position shown in FIG. 3. The cycle will then be repeated.

The weight on top of the sand engaging feet 100 and 105 will, of course, develop momentum which at impact will cause the feet to be driven into the sand contributing to the removal of air and proper ramming thereof.

It is, however, entirely possible to ram uniformly sand molds not using the weight or packing feet 100 or 105 simply by permitting the sand-filled flask to fall freely through a substantial stroke distance onto the confined air pocket for impact. The drop accelerator air cylinder 87 may simply be used to obtain higher velocities in a shorter stroke.

*Impact characteristics*

The characteristics of the impact can be controlled not only by varying the volume of the chamber of confined or trapped air between the table and base, but also by varying the bleed hole orifice through the adjustment of screw 47 seen in FIG. 3. The following table of test results utilizing a machine having a free drop indicates the variations obtainable in the impulse characteristics, as well as the G's of deceleration:

| Bleed Hole Dia., in. | Drop Height, ft. | Bounce No. | Drop Time, sec. | G's | Duration of Impact, sec. |
|---|---|---|---|---|---|
| 0 | 3 | 1 | .405 | 490 | .014 |
|   |   | 2 | .333 | 197 | .016 |
|   |   | 3 | .273 | 102 | .018 |
|   |   | 4 | .228 | 67 | .020 |
|   |   | 5 | .195 | 46 | .022 |
|   |   | 6 | .169 | 33 | .024 |
|   |   | 7 | .146 | 23 | .026 |
|   |   | 8 | .126 | 18 | .028 |
|   |   | 9 | .108 | 15 | .029 |
|   |   | 10 | .092 | 10 | .030 |
|   | 2 | 1 | .307 | 251 | .014 |
|   |   | 2 | .287 | 120 | .018 |
|   |   | 3 | .232 | 69 | .020 |
|   |   | 4 | .193 | 44 | .021 |
|   |   | 5 | .161 | 28 | .024 |
|   |   | 6 | .130 | 20 | .025 |
|   |   | 7 | .104 | 13 | .028 |
|   |   | 8 | .081 | 10 | .030 |
|   | 1 | 1 | .207 | 95 | .016 |
|   |   | 2 | .216 | 64 | .020 |
|   |   | 3 | .183 | 44 | .021 |
|   |   | 4 | .152 | 28 | .022 |
|   |   | 5 | .125 | 18 | .024 |
|   |   | 6 | .100 | 13 | .026 |
|   |   | 7 | .080 | 8 | .028 |
| 3/16 (.0275) | 3 | 1 | .405 | 560 | .010 |
|   |   | 2 | .288 | 123 | .016 |
|   |   | 3 | .200 | 46 | .020 |
|   |   | 4 | .140 | 20 | .024 |
|   |   | 5 | .092 | 13 | .030 |
|   | 2 | 1 | .307 | 261 | .014 |
|   |   | 2 | .241 | 74 | .018 |
|   |   | 3 | .169 | 31 | .022 |
|   |   | 4 | .117 | 16 | .026 |
|   |   | 5 | .072 | 10 | .033 |
|   | 1 | 1 | .207 | 87 | .018 |
|   |   | 2 | .177 | 36 | .022 |
|   |   | 3 | .122 | 18 | .026 |
|   |   | 4 | .077 | 10 | .031 |
| 1/4 (.0492) | 3 | 1 | .405 | 620 | .011 |
|   |   | 2 | .264 | 100 | .012 |
|   |   | 3 | .153 | 23 | .021 |
|   |   | 4 | .077 | 8 | .028 |
|   | 2 | 1 | .307 | 280 | .014 |
|   |   | 2 | .215 | 51 | .017 |
|   |   | 3 | .121 | 18 | .024 |
|   | 1 | 1 | .207 | 92 | .012 |
|   |   | 2 | .149 | 23 | .024 |
|   |   | 3 | .071 | 8 | .027 |
| 5/16 (.077) | 3 | 1 | .405 | 690 | .010 |
|   |   | 2 | .243 | 72 | .016 |
|   |   | 3 | .089 | 8 | .026 |
|   | 2 | 1 | .307 | 297 | .013 |
|   |   | 2 | .187 | 38 | .021 |
|   | 1 | 1 | .207 | 87 | .012 |
|   |   | 2 | .100 | 10 | .026 |
| 3/8 (.111) | 3 | 1 | .405 | 720 | .010 |
|   |   | 2 | .216 | 51 | .015 |
|   | 2 | 1 | .307 | 317 | .011 |
|   |   | 2 | .156 | 23 | .020 |
|   | 1 | 1 | .207 | 87 | .014 |
| 7/16 (.15) | 3 | 1 | .405 | 805 | .009 |
|   |   | 2 | .204 | 41 | .016 |
|   | 2 | 1 | .307 | 346 | .010 |
|   |   | 2 | .136 | 15 | .021 |
|   | 1 | 1 | .207 | 92 | .014 |

Figure 7:
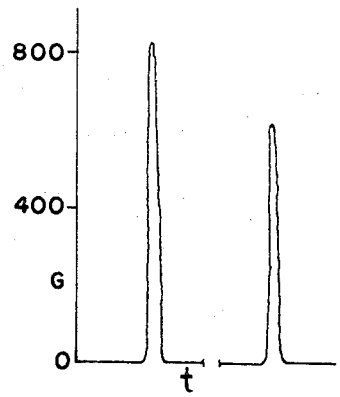
FIG. 7 is a diagrammatic acceleration-time graph fragmentarily foreshortened showing the characteristics of the impulse obtained by the invention.

The data above between each line represents but a single drop and briefly reviewing such data, it will be seen that with a drop height of 3 feet and a bleed hole completely closed, as many as 10 bounces were obtained with an initial impact on the first bounce providing 490 G's with the G's on subsequent bounces dropping to as low as 10. At a 2 foot height the initial G impulse was 251 and at 1 foot 95. Skipping down toward the bottom of the chart with the bleed hole open to 7/16 of an inch in diameter, a 3 foot free drop produced 805 G's but only 2 bounces. The G's were measured with a carefully calibrated accelerometer and the drop time and duration of impact was measured by a recording device plotting the G's on a time chart such as seen in FIG. 7. The duration of impact is obtained by measuring graphically the base of the tall triangles formed on the chart.

Accordingly with the machine and method of the present invention on the initial impact at a drop height of 3 feet there was developed from about 490 G's to about 805 G's. At a 2 foot drop height there was developed from about 251 G's to about 346 G's, and at a 1 foot height from about 87 G's to about 95 G's. The maximum velocity developed at a 1 foot drop height is, of course, about 8 feet per second; at 2 foot height, about 11.31 feet per second; at 3 feet height, about 13.85 feet per second; and at 4 foot height, about 16 feet per second. This compares to a maximum velocity obtained in a conventional jolt machine of about 1 foot per second wherein a 2 inch jolt height drop is provided. A conventional jolt machine will develop between about 50 to 100 Gs with an instantaneous metal-to-metal impact, much of the energy of which is dissipated, while the machine and method of the present invention develops useful G's of from about 100 to about 800.

Molds of uniform high hardness have been produced utilizing but a single drop stroke by accelerating the body of the sand to a substantial velocity at impact with the impact being completely without metal contact.

It can now be seen that there is provided a molding machine and method wherein a sand-filled mold is accelerated to a substantial speed on the order of from at least about 8 to about 16 feet per second and then rapidly decelerated in a short but definite interval to create from about 100 to in excess of 800 useful G's to ram the sand within the mold box. The walls of the mold box transverse the direction of travel and may be relatively movable to confine and pack the sand about a pattern and the following wall may have substantial momentum. The rapid deceleration is, of course, obtained without the sharp impact of metal-to-metal contact and accordingly the body of sand travelling at substantial velocity is rammed uniformly by the sudden yet not instantaneous impact.

Other modes of applying the principle of the invention may be employed, change being made as regards the details described, provided the features stated in any of the following claims or the equivalent of such be employed.

I, therefore, particularly point out and distinctly claim as my invention:

1. A foundry molding machine comprising a support for a pattern containing sand-filled flask, means operative to accelerate said support to a substantial speed, and confined air means to stop the same to ram the sand within such flask without metal-to-metal contact.

2. A foundry molding machine as set forth in claim 1 wherein such substantial speed is obtained by dropping said support.

3. A foundry molding machine as set forth in claim 1 wherein said support comprises a table, and means operative to drop said table from a substantial height onto such confined air pocket to ram the sand within the flask, said table including means to form such pocket as it is dropped.

4. A foundry molding machine as set forth in claim 1 wherein such support is travelling at a speed of from at least about 8 feet per second to at least about 16 feet per second prior to striking such confined air pocket.

5. A foundry molding machine as set forth in claim 1 wherein the striking of such confined air pocket by said support produces from about 100 to about 800 G's.

6. A foundry molding machine as set forth in claim 1 wherein such substantial speed is obtained by pneumatic piston-cylinder assembly.

7. A foundry molding machine as set forth in claim 1 including a weight against the sand within such flask, and means mounting said weight and said support for relative movement whereby the momentum of said weight when said support is stopped will contribute to the ramming of the sand within such flask.

8. A foundry molding machine comprising a jolt table adapted to support a pattern containing sand-filled flask, means operative to drop said table from a substantial height, and means operative to form a confined air pocket as said table is dropped to stop the same and ram the sand within such flask.

9. A foundry molding machine as set forth in claim 8 wherein said last-mentioned means comprises a skirt on said table and a base, said skirt being adapted closely to telescope over said base to confine air between said table and base.

10. A foundry molding machine as set forth in claim 9 including means operative to adjust the volume of air trapped within such pocket.

11. A foundry molding machine as set forth in claim 10 including means to vent air from such pocket at a controlled rate.

12. A foundry molding machine as set forth in claim 8 including a weight supported on the sand within such flask developing substantial momentum during the drop of said table.

13. A foundry molding machine as set forth in claim 12 including a pneumatic air cylinder operative to urge said weight against such sand prior to such drop thus to increase the maximum speed of said table at impact against such confined air pocket.

14. A foundry molding machine as set forth in claim 13 wherein said weight includes a plurality of relatively movable feet operative to engage the sand within such flask.

15. A foundry molding machine as set forth in claim 8 including means operative to draw the pattern from the completed mold upon rebound of said table from such confined air pocket.

References Cited

UNITED STATES PATENTS

| | | | |
|---|---|---|---|
| 1,791,583 | 2/1931 | Stoney | 164—39 |
| 1,931,902 | 10/1933 | Oyster | 164—39 X |
| 2,817,127 | 12/1957 | Beech | 164—196 |
| 3,111,730 | 11/1963 | Ivarsson | 164—196 X |
| 3,234,601 | 2/1966 | Hatch et al. | 164—196 X |

J. SPENCER OVERHOLSER, *Primary Examiner.*

E. MAR, *Assistant Examiner.*